Aug. 10, 1954        J. C. OWEN        2,686,286
SYNCHRONOUS RING RECTIFIER
Filed Sept. 25, 1951        2 Sheets-Sheet 1
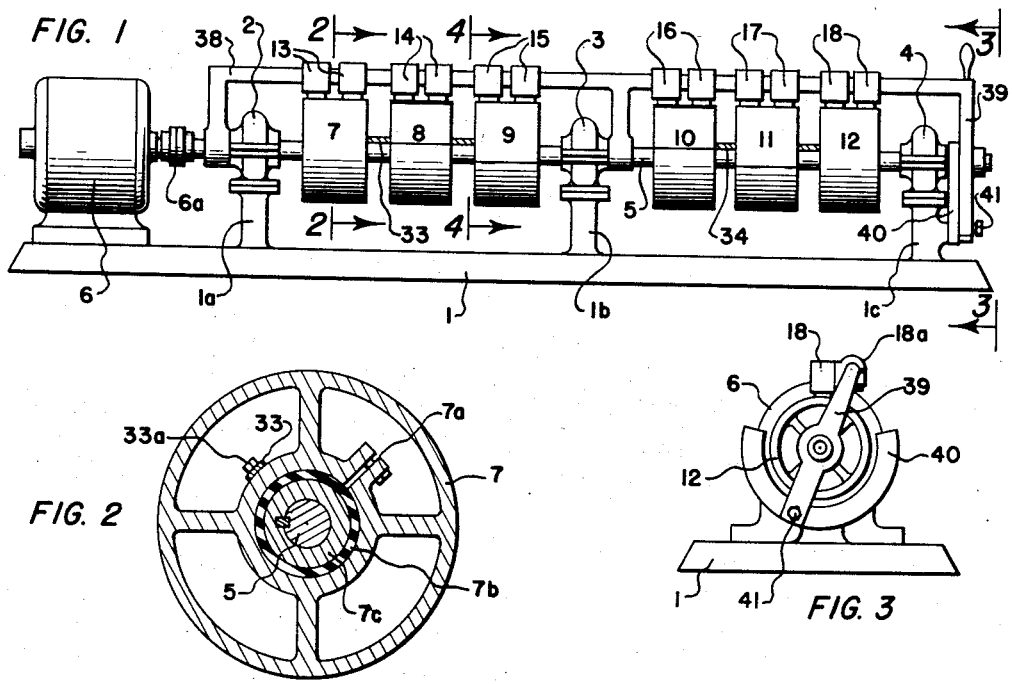
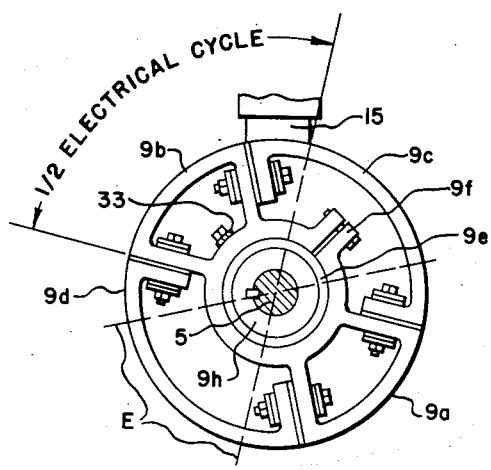
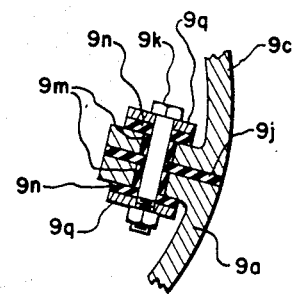
INVENTOR.
JOHN C. OWEN
BY
*Wm. H. Dean*
AGENT

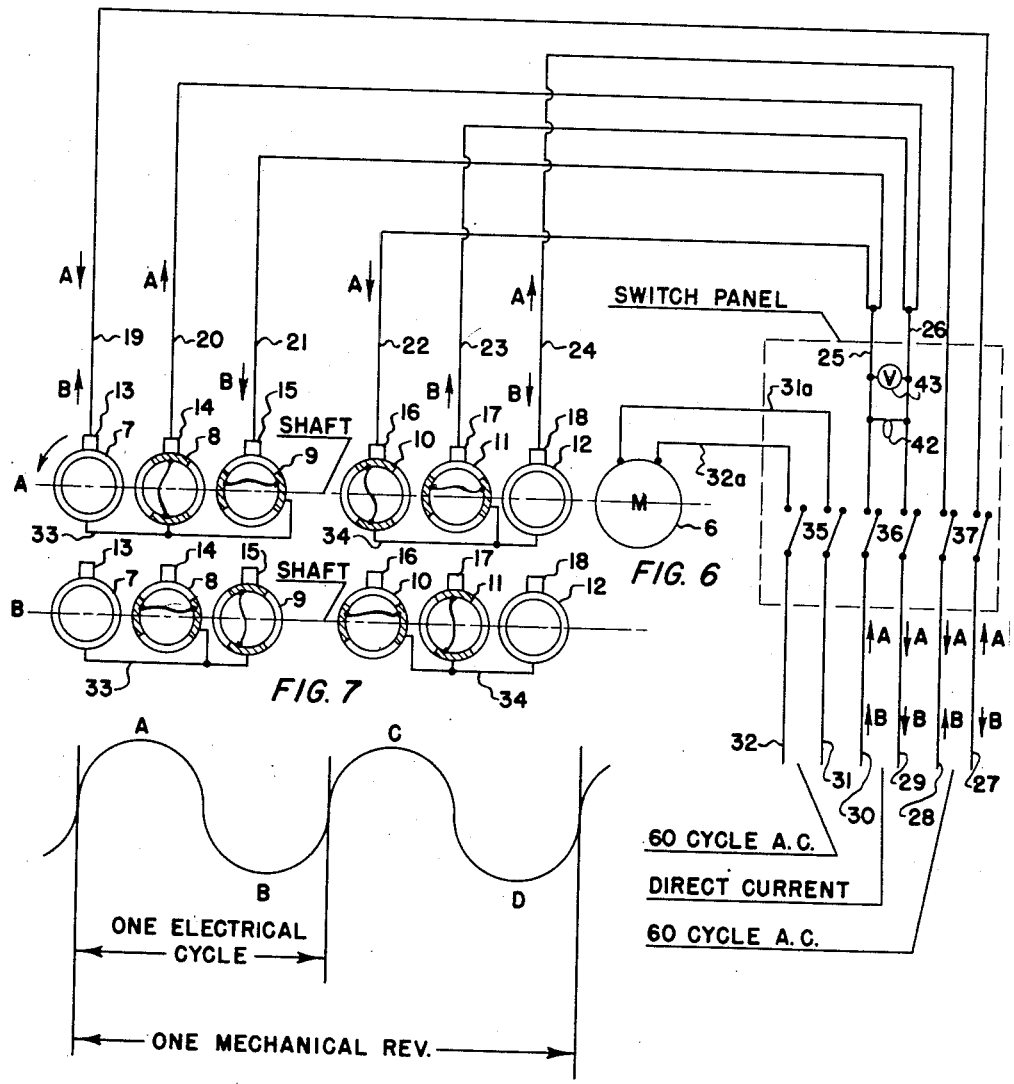

Patented Aug. 10, 1954

2,686,286

UNITED STATES PATENT OFFICE 2,686,286

SYNCHRONOUS RING RECTIFIER

John C. Owen, San Diego, Calif.

Application September 25, 1951, Serial No. 248,153

8 Claims. (Cl. 321—50)

My invention relates to a synchronous ring rectifier, more particularly for the conversion for alternating current to direct current and the objects of my invention are;

First, to provide a rectifier of this class having a pair of slip rings and a plurality of segment rings on a shaft rotatable by a synchronous speed motor whereby, alternating current is converted to direct current accomplishing full wave rectification.

Second, to provide a rectifier of this class which will convert one or more phases of alternating current to direct current by using a synchronous ring rectifier in each phase of the alternating current.

Third, to provide a synchronous ring rectifier which may be used with an alternating current generator in place of the conventional commutator for delivering direct current.

Fourth, to provide a synchronous ring rectifier of this class in which the segment rings are provided with conducting portions having an arcuate length which added to the width of the brush engaging the same is equal to one-half of an electrical cycle whereby, arcing of the brushes at the contact transition is eliminated.

Fifth, to provide a synchronous ring rectifier of this class having novel means for adjusting the brushes peripherally of the rings for attaining synchronism of the alternating current flowing through the slip rings with the synchronous rotation of the shaft which is operated by a synchronous motor of the same alternating frequency.

Sixth, to provide a synchronous ring rectifier of this class which is very simple and easy to operate.

Seventh, to provide a synchronous ring rectifier of this class which is very small and compact in proportion to its capacity.

Eighth, to provide a synchronous ring rectifier of this class which may be used for numerous purposes in the conversion of alternating current to direct current, and;

Ninth, to provide a synchronous ring rectifier of this class which is very simple and economical of construction, efficient in operation and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a side elevational view of the mechanism of my synchronous ring rectifier.

Figure 2 is an enlarged sectional view taken from the line 2—2 of Fig. 1.

Figure 3 is an end view of my synchronous ring rectifier taken from the line 3—3 of Fig. 1.

Figure 4 is an enlarged sectional view taken from the line 4—4 of Fig. 1.

Figure 5 is an enlarged fragmentary sectional view of the segment connection of the structure shown in Fig. 4 of the drawings.

Figure 6 is a diagrammatic view of the electrical equipment employed in connection with my synchronous ring rectifier.

Figure 7 is a view of a portion of the diagrammatic illustration of Fig. 6 showing a different rotational position of the conducting rings of my synchronous ring rectifier and;

Figure 8 is a diagrammatic illustration of the flow of current related to the diagrammatic illustration in Fig. 6 of the drawings.

Similar characters of reference refer to similar parts and portions throughout the several views of the drawings.

The base 1, bearings 2, 3, and 4, shaft 5, motor 6, rings 7, 8, 9, 10, 11 and 12, brushes 13, 14, 15, 16, 17 and 18, conductors 19, 20, 21, 22, 23, 24, 25, 26, 27, 28, 29, 30, 31, 32, 33 and 34, switches 35, 36 and 37, brush bar 38, brackets 39 and 40, set screw 41, lamp 42, and voltmeter 43 constitute the principal parts and portions of my synchronous ring rectifier.

The base 1 is a substantially rigid base having fixed bearing supports 1a, 1b and 1c on which the bearings 2, 3 and 4 respectively are mounted. The shaft 5 is supported in the bearings 2, 3 and 4 and is connected to the shaft of the motor 6 by means of the coupling 6a. The rings 7, 8, 9, 10, 11 and 12 are fixed on the shaft 5 and the brushes 13, 14, 15, 16, 17 and 18 engage these rings 7, 8, 9, 10, 11 and 12 respectively and these brushes are supported on the brush bar 38 which is movable around the rings in an arcuate path concentric with the axis of the shaft 5. One of the brushes 18 as shown in Fig. 3 of the drawings is representative of the type of these brushes and is provided with a clamping portion 18a which fixes the same on the bar 38. This bar 38 is pivotally mounted about the axis of the shaft 5 and is provided with a bracket 39, on its one end having the set screw 41 in connection therewith which is adapted to fix the bracket 39 against the bracket 40 which is stationarily secured to the base 1. The set screw 41 merely engages the bracket 40 and fixes the bracket 39 in certain adjusted positions as desired. The slip rings 7 and 12 are continuous conducting rings adapted to conduct alternating current and are similar in construction. The ring 7 as shown in Fig. 2 of the drawings is engaged by the brushes 13 and is provided with a clamping hub 7a which is clamped peripherally of an insulating sleeve 7b which surrounds the hub 7c keyed to the shaft 5. The conductor 33 is fixed to the ring 7 by means of the bolt 33a. The conductor 33 is likewise fixed to the segment rings 8 and 9. The construction of the segment rings 8, 9, 10 and 11 is similar. The segment ring 9 as shown in Fig. 4 of the drawings is provided with conducting segment portions 9a and 9b and non-conducting segment portions 9c and 9d. The conducting segment portions 9a and 9b are integral with each other and are fixed on the insulating sleeve 9e by means of the clamp portion 9f. The insulating sleeve 9e is positioned in surrounding relation with the hub 9h which is keyed to the shaft 5. It will be noted that the segment portions 9c and 9d are insulated from the segment portions 9a and 9b as shown best in Fig. 5 of the drawings wherein the segment portion 9c is abutted to an insulating member 9j which separates it from the segment member 9a. The connecting bolt 9k passes through insulating sleeves 9m at opposite ends of which insulating plates 9n are abutted by metal clamping plates 9q. The arcuate length of the segment portions 9a and 9b added to the width of the brush 15 equals one-half of an electrical cycle all as shown best in Fig. 4 of the drawings. In this particular illustration and disclosure the device employs the shaft 5 operating at 1800 revolutions per minute. Each conducting segment 9a and 9b plus the width of the brush 15 equals 90 degrees, therefore the employment of four segment rings provides for two complete electrical cycles for each mechanical cycle of the shaft 5 whereby 3600 electrical cycles are completed with each 1800 revolutions of the shaft 5. 3600 electrical cycles corresponds to the operation of the 60 cycle alternating current and the particular rotating speed of the shaft 5 which is controlled by the synchronous motor 6 operating on 60 cycle alternating current. It will be seen that the shaft 5 might be rotated at different speeds and that the number of degrees of the segments 9a and 9b might be altered and that each of the segment rings 8, 9, 10 and 11 might employ more than two conductor segments to correspond to different rotational speed of the shaft 5. Referring to Fig. 4 of the drawings, it will be noted that the dash lines E indicate the relative disposition of the conductor segments of the segment rings 8 and 10 while the conductor segments of the segment ring 11 corresponds to the position of the segments 9a and 9b on the shaft 5. Thus the conducting segments of the rings 9 and 11 are corresponding in disposition and the conducting segments of the segment rings 8 and 10 are corresponding in disposition and are at 90 degrees to the disposition of the conducting segments of the rings 9 and 11. As shown in Fig. 6 the schematic diagram of the electrical wiring it will be seen that the rings 7, 8, 9, 10, 11 and 12 are shown corresponding to the half cycle A as illustrated in Fig. 8 of the drawings while the rings 7, 8, 9, 10, 11 and 12 shown in Fig. 7 of the drawings are shown in position corresponding to the half cycle B illustrated in Fig. 8 of the drawings. The arrows adjacent the electrical conductors 19, 20, 21, 22, 23, 24, 27, 28, 29 and 30 are designated by the characters A and B which correspond to the position of the rings in Figs. 6 and 7 respectively and to the characters A and B in Fig. 8 which illustrate the consecutive half cycle operation of the current flow. Thus the rings in Fig. 7 are illustrated in a position 90 degrees from the rings shown in Fig. 6. In tracing the arrows B on the conductors reference is made directly to Fig. 7 for the position of the rings.

The operation of my synchronous ring rectifier is substantially as follows:

The switch 35 is first closed causing 60 cycle alternating current to flow from the conductors 31 and 32 to the conductors 31a and 32a and through the motor 6. This motor 6 operates the shaft 5 at synchronous speed causing synchronous rotation of all of the rings 7, 8, 9, 10, 11 and 12. Electrical conduction to these rings is made through the brushes 13, 14, 15, 16, 17 and 18 in contact therewith. Referring to Fig. 8 of the drawings and to the half cycle A it will be seen that the alternating current when conducted to the conductors 19 and 24 by closing the switch 37 flows into the ring 7 and outwardly through the ring 8 to the conductor 26 and in the direction of the arrow A in the conductor 29 and back through the conductor 30 to the conductor 22 through the ring 10 and conductor 34 to the ring 12 and back through the conductor 24 to the switch 37 and the alternating current line 28. In the second half of the electrical cycle designated B in Fig. 8 of the drawings the alternating current flows in the direction of the arrow B in the conductor 28 through the switch 37 and into the conductor 24 through the slip ring 12 through the conductor 34 into the segment ring 11 in a position as shown in Fig. 7 of the drawings and back through the conductor 23 to the conductor 26 and in the conductor 29 through the switch 36. The current flows back through the conductor 30 into the conductor 21 through the ring 9 in the position as shown in Fig. 7 of the drawings through the conductor 33 and slip ring 7 into the conductor 19 through the switch 37 and into the conductor 27 on the alternating current side. Particular attention is called to the illustration of the arrows A and B in connection with the direct current conductors 29 and 30 which discloses positive and negative direct current which is indicated by the operation of the lamp 42 and voltmeter 43 at the initiation of operation of my synchronous ring rectifier.

During initial operation of my synchronous ring rectifier, after the switch 35 has been closed and the switch 37 has been closed the lamp 42 and voltmeter 43 are referred to in order to indicate proper adjustment of the brush bar 38 in order to attain the maximum voltage which is accomplished by pivotal movement of the bracket 39 together with the brush bar 38 about the axis of the shaft 5. When maximum positive direct current is indicated on the voltmeter 43 the set screw 41 is fixed against the bracket 40 and my synchronous ring rectifier is ready for continuous operation. It will be here noted that the arrangement of the conducting segments relative to the brushes as shown in Fig. 4 of the drawings provides for an even flow of alternating current and also prevents arcing of the brushes at the contact transition due to the clearance of each brush before the next contact is made all of which is illustrated by dash lines E and the solid line disclosure of the segment. For example, the rotation of the shaft 5 causes the conducting segments of the ring 8 to pass the brushes 14 exactly at the same time that the brushes 17 engage the ends of one conducting segment of the ring 11, therefore the brushes and the segments cover a combined arcuate length of the rings equal to one-half of an electrical cycle. It will be noted that my synchronous ring rectifier may be used to convert direct current to alternating current.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a synchronous rotating ring rectifier, a pair of segmented rings, each having circumferentially disposed alternate conducting and insulated segments, said rings mounted upon a shaft with said conducting segments of one ring opposite the insulated segments of the other ring of said pair, a motor connected to said shaft for rotating said rings in synchronism with alternating current to be rectified, a slip ring upon said shaft electrically connected to the conducting segments of said pair of segmented rings, a brush bearing upon said slip ring, said brush connected to a source of alternating electric current to be rectified, a brush bearing upon the periphery of each said segmented rings, said brushes aligned with respect to said shaft, a direct current load, said segmented-ring brushes electrically connected to said load, the circumferential length of each said conducting segment being equal to a fraction of the length of said periphery of said segmented ring less the circumferential length of said brush and the length of each insulated segment thereof being equal to the same fraction of the length of said periphery plus the circumferential length of said brush, the abutting edges of said segments being parallel to said shaft; the recited structure causing contact to be made between the conducting segment of one said segmented ring and the brush bearing thereupon at the same instant as contact is broken between the conducting segment of the other said segmented ring and the brush bearing thereupon as said shaft revolves, said synchronous rotation effecting said changes of contact each half cycle of said alternating current for the rectification thereof.

2. In a synchronous rotating ring rectifier, a pair of segmented rings, each having an even total number of conducting and non-conducting segments alternately disposed around the circumference thereof, said rings concentrically mounted upon a shaft the conducting segments of one ring being symmetrically opposite the non-conducting segments of the other ring of the pair, an electric motor connected to said shaft for rotating said segmented rings in synchronism with alternating current to be rectified, a slip ring upon said shaft electrically connected to each conducting segment of said pair of segmented rings, a brush bearing upon said slip ring, said brush electrically connected to a circuit carrying said alternating current to be rectified, a brush bearing upon the circumference of each of said segmented rings, said brushes disposed in a line parallel to said shaft and electrically connected to form the direct current output terminals of said rectifier, the circumferential length of each said conducting segment being a fraction of the full circumference of said segmented ring less the circumferential length of said brush bearing thereupon and the circumferential length of each said non-conducting segment being equal to the same fraction of said full circumference plus the circumferential length of said brush, the abutting edges of said segments being parallel to said shaft; the recited structure causing contact to be made between a conducting segment of one said segmented ring and the brush bearing upon said ring at the same instant of time as contact is terminated between a conducting segment of the other said segmented ring of said pair and said brush bearing thereon as said shaft revolves, said synchronous rotation effecting said changes of contact each half cycle of said alternating current for the rectification thereof.

3. In a synchronous rotating ring rectifier, a pair of segmented rings, each having two conducting and two non-conducting segments alternately disposed around the periphery thereof, said rings concentrically mounted along a shaft, the conducting segments of one ring being symmetrically opposite the non-conducting segments of the other ring of the pair, a four pole synchronous electric motor mechanically connected to said shaft for rotating said segmented rings in synchronism with alternating current to be rectified, said motor electrically connected to a circuit carrying said alternating current, a slip ring upon said shaft electrically connected to each conducting segment of said pair of segmented rings, a brush bearing upon said slip ring, said brush electrically connected to said circuit carrying said alternating current, a brush bearing upon the periphery of each of said segmented rings, said brushes aligned parallel to said shaft and constituting the direct current output terminals of said rectifier, the circumferential length of each said conducting segment being one-fourth of the full circumference of said segmented ring minus the circumferential length of said brush bearing thereupon and the length of each said non-conducting segment being one-fourth of the full circumference plus the circumferential length of said brush, the abutting edges of said segments being parallel to said shaft and the leading and trailing edges of said brushes being parallel to said shaft; the recited structure causing contact to be made between one conducting segment of one said segmented ring at the same instant of time as contact is terminated between a conducting segment in quadrature relation thereto on the other said segmented ring of said pair and said brush bearing thereupon as said shaft revolves, said synchronous rotation effecting said changes of contact each half cycle of said alternating current for the rectification thereof.

4. The pair of segmented rings of claim 3 in which each has one conducting and one non-conducting segment, the motor has two poles and the circumferential lengths of the segments and the positioning thereof are referred to a half of the full circumference of said segmented rings.

5. The pair of segmented rings of claim 3 in which each has three conducting and three non-conducting segments, the motor has six poles and the circumferential lengths of the segments and the positioning thereof are referred to a sixth of the full circumference of said segmented rings.

6. The pair of segmented rings of claim 3 in which each has four conducting and four non-conducting segments, the motor has eight poles and the circumferential lengths of the segments and the positioning thereof are referred to an eighth of the full circumference of said segmented rings.

7. The pair of segmented rings of claim 3 in which each has $n$ conducting and $n$ non-conducting segments, the motor has $2n$ poles and the circumferential lengths of the segments and the positioning thereof are referred to $\frac{1}{2}n$ of the full circumference of said segmented rings.

8. In a synchronous rotating ring rectifier, two pairs of segmented rings, each having circumferentially alternate conducting and non-conducting segments, said rings concentrically mounted on a shaft, the conducting segments of one ring being opposite the non-conducting segments of the other ring of the pair and each pair circumferentially oriented in the same position upon said shaft, an electric motor connected to said shaft for rotating said segmented rings in synchronism with alternating current to be rectified, two slip rings upon said shaft, one connected to each conducting segment of one pair of segmented rings, a brush bearing upon each said slip ring, each said brush electrically connected to one side of a circuit carrying said alteranting current to be rectified, a brush bearing upon the periphery of each said segmented rings, said brushes disposed in a line parallel to said shaft, one brush of each similarly - circumferentially - positioned segmented ring of each pair electrically joined together to form one direct current output terminal of said rectifier, the circumferential length of each said conducting segment being a fraction of the full circumference of said segmented ring less the circumferential length of said brush bearing thereupon and the length of each said non-conducting segment being equal to the same fraction of said circumference plus the circumferential length of said brush, the abutting edges of said segments being parallel to said shaft; the recited structure causing contact to be made between a conducting segment of one said segmented ring and the brush bearing upon said ring at the same instant of time as contact is terminated between a conductive segment of the other said segmented ring of the same pair and said brush bearing thereon as said shaft revolves, said synchronous rotation effecting said changes of contact each half cycle of said alternating current for the rectification thereof.

References Cited in the file of this patent

UNITED STATES PATENTS

| Number | Name | Date |
|---|---|---|
| 552,260 | Pollak | Dec. 31, 1895 |
| 599,789 | Muller | Mar. 1, 1898 |
| 1,239,588 | Gilbert | Sept. 11, 1917 |
| 1,252,615 | Quill | Jan. 8, 1918 |
| 1,570,789 | Seifke | Jan. 26, 1926 |
| 1,602,934 | Quill | Oct. 12, 1926 |
| 1,838,629 | Melazzo | Dec. 29, 1931 |